United States Patent [19]

Quick

[11] 4,212,274
[45] Jul. 15, 1980

[54] POLLUTION EMISSION CONTROL AND FUEL SAVING DEVICE FOR INTERNAL COMBUSTION ENGINES

[76] Inventor: Thomas E. Quick, 1616 Park Pl., Wichita, Kans. 67203

[21] Appl. No.: 761,340

[22] Filed: Jan. 21, 1977

Related U.S. Application Data

[63] Continuation-in-part of Ser. No. 722,601, Sep. 13, 1976, abandoned, and a continuation of Ser. No. 454,475, Mar. 25, 1974, abandoned.

[51] Int. Cl.² ............................................. F02M 31/00
[52] U.S. Cl. .................................... 123/548; 123/591; 261/144; 261/145; 165/52
[58] Field of Search ............... 123/122 AB, 122 AC, 123/122 R, 122 A; 261/144, 145, DIG.55; 165/52 R

[56] References Cited

U.S. PATENT DOCUMENTS

| | | | |
|---|---|---|---|
| 890,970 | 6/1908 | Durr | 123/122 AB |
| 1,017,186 | 2/1912 | Stewart | 123/122 AC |
| 1,122,038 | 12/1914 | Smith | 123/141 |
| 1,242,975 | 10/1917 | Planche | 165/154 |
| 1,476,315 | 12/1923 | Wilsey | 123/122 AC |
| 1,499,800 | 7/1924 | Bannister | 123/122 AB |
| 3,851,624 | 12/1974 | Everett | 123/122 AC |
| 4,020,811 | 5/1977 | LaForce | 123/122 AB |

FOREIGN PATENT DOCUMENTS 937272 3/1948 France ......................................... 165/52

*Primary Examiner*—Ronald H. Lazarus
*Attorney, Agent, or Firm*—Robert E. Breidenthal

[57] ABSTRACT

Carbonation enhancer having a cylindrical shell that is closed at one end by an envolute wall spaced from the inner end of a withdrawal tube, the output stream of a conventional carburetor is directed tangentially into space between the shells and caused to move in a spiral path toward the envolute closure wall by a spiral vane in the space and on reaching the envolute wall to move radially inwardly and into the inner end of the withdrawal tube to travel axially in a direction opposite that of the spiral path with the stream exiting the tube to enter the inlet manifold of the engine. Waste engine heat is applied to the exterior of the cylindrical shell in an amount sufficient to vaporize liquid fuel droplets centrifuged thereagainst from the stream as the latter traverses the spiral path portion of its travel from the carburetor to the intake manifold.

13 Claims, 5 Drawing Figures

POLLUTION EMISSION CONTROL AND FUEL SAVING DEVICE FOR INTERNAL COMBUSTION ENGINES

This invention is a continuation-in-part of my copending Application Ser. No. 722,601, which is entitled POLLUTION EMISSION CONTROL AND FUEL SAVING DEVICE FOR INTERNAL COMBUSTION ENGINES, that was filed Sep. 13, 1976 as a continuation of my Application Ser. No. 454,475, entitled POLLUTION EMISSION CONTROL AND FUEL SAVING DEVICE FOR INTERNAL COMBUSTION ENGINES that was filed Mar. 25, 1974 and subsequently abandoned.

The present invention relates to new and useful improvements in methods of and apparatus for increasing the homogenization and expediting the approach toward thermodynamic equilibrium of fuel-air mixtures during the extremely brief time interval available after the instant of conventional carburetion and prior to such carbureted mixture being introduced into the combustion chamber of a conventional internal combustion engine. Furthermore, the invention relates to such method and apparatus such that the sensible heat of mixture output of the carburetor is increased a minimal amount.

Generally speaking, the objectives of the instant invention are the same as those set forth in the above identified prior applications.

In addition to the objectives set forth in my prior applications should be mentioned the objective of providing compact apparatus which can most conveniently be added as a unit to existing automotive power plants in the limited space therefor, or alternatively be conveniently adapted for inclusion as an integral component of an original automotive power plant of the internal combustion engine type.

Also, it is an objective to provide compact apparatus as specified above wherein the inlet and outlet thereof are in close proximity, and wherein a valve controlled bypass can be connected therebetween if desired.

Another refinement upon the objectives or aims set forth in my prior applications resides in following the initial centrifuging of the mixture by inverting the radial order of initially centrifuged components and thereafter continuing centrifuging so that such latter centrifuging is effected with respect to materials having a density gradient opposite that which such further centrifuging tends to effect so as to maximize radial countercurrent flow of relatively dense and lighter portions of the mixture, whereby interdiffusion and turbulent mixing both contribute to rapid homogenization without excessive pressure loss at high flow rates.

A broad aspect of the invention has to do with a method of treating the output stream of the curburetor of an internal combustion engine prior to introducing the same into the intake manifold of the engine so as to obtain a stream approaching equilibrium that is essentially liquid free and of substantially saturation composition, said method comprising the step of imparting angular momentum to the carburetor output stream and centrifuging vaporizable liquid droplets entrained therein against a confining shell by directing such stream to travel a spiral path having an axial component in one direction within the confines of the confining shell, the step of thereafter directing the stream from the spiral path to the intake manifold along an exiting path that is radially within, separated from and having an axial component in a direction opposite to that of the spiral path, and the step of heating the exterior of the confining shell an amount approximately sufficient to vaporize all the liquid droplets centrifuged thereagainst.

Another broad aspect of the invention involves a carbonation enhancer for use intermediate the carburetor and the intake manifold of an internal combustion engine, said enhancer comprising an axially extending housing comprised of an outer shell closed at one end of the housing by an end wall, said housing having an axially extending reentrant withdrawal tube at its other end that has an internal inlet end spaced from the end wall, said tube having an external outlet end adjacent the other end of the housing, said shell and said tube being axially spaced to define an axially extending annular space therebetween, a spiral vane in said space to define a spiral passageway means extending from an inlet end of the housing to said one end thereof for directing a fluid stream entering the inlet end of the housing along a spiral path axially toward said one end of the housing, means for enabling coupling of the outlet end of the tube to an engine intake manifold, means for enabling coupling of the inlet end of the housing to a carburetor, and means for heating the shell.

Other aspects, features, objectives and advantages of the invention will become evident as the following description of a preferred embodiment of the invention progresses, such description being presented in association with the accompanying drawings, illustrative thereof, wherein.

Figure 1:
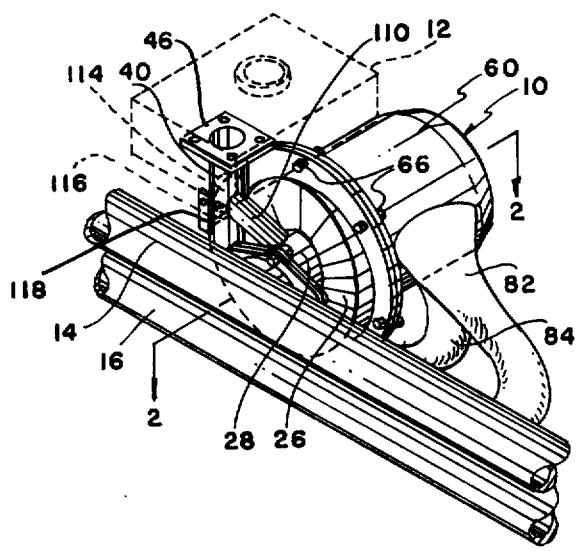
FIG. 1 is an isometric view of the enhancer which is partially shown in dashed outline, and which is shown operatively associated with carburetor shown in dashed outline and fragmentarily shown intake and exhaust engine manifolds.

Referring now to the drawings wherein like numerals designate like parts throughout the various views, the reference numeral 10 designates the enhancer generally, the same being shown and hereinafter described in operative association with a conventional carburetor of the type wherein liquid gasoline is aspirated into a valve controlled air stream passing through a venturi throat, shown in dashed outline at 12, and conventional intake and exhaust manifolds 14 and 16 of a conventional reciprocating four-stroke cycle internal combustion engine, not shown.

Details of the carburetor 12 are not shown for the reason that, as stated, the same is entirely conventional and as such would plainly obfuscate the instant invention. Suffice to say and as well known, the carburetor 12 provides a fuel-air output stream of predetermined or controllable fuel-air ratio that is a mixture such that liquid fuel droplets or a mist or fog thereof, is entrained in air that is usually only partly saturated with fuel in its vapor phase. The fuel, of course, is understood to be such as gasoline or the like in that the same can easily be contained at modest pressures at the usual temperatures to which automobile fuel tanks are subjected and part of which can be volatilized from a fine mist at reasonable temperatures into lean combustible mixtures thereof with air.

The output stream of the carburetor 12 will ordinarily be "wet" and would ordinarily remain so even if the air admitted to the carburetor 12 were sufficiently preheated that all the liquid fuel would (on the mixture attaining thermodynamic equilibrium) be vaporized for the simple reason that there is simply not enough time for the mixture to attain such an equilibrium prior to reaching the combustion chambers of the engine. Bearing in mind that the present invention is primarily concerned with engine operating conditions associated with substantial to maximum load (at least about 10% maximum load) and at least moderate to maximum engine speed (say, 25% to maximum permissible engine rpm); such conditions being those under which most fuel is consumed or greatest pollution rates occur; the fuel-air stream will only have something on the order of about 0.01 second to approach thermal equilibrium prior to entering the combustion chambers. The gross inadequacy of such a time interval is deemed manifest and this point will not be belabored.

Figure 2:
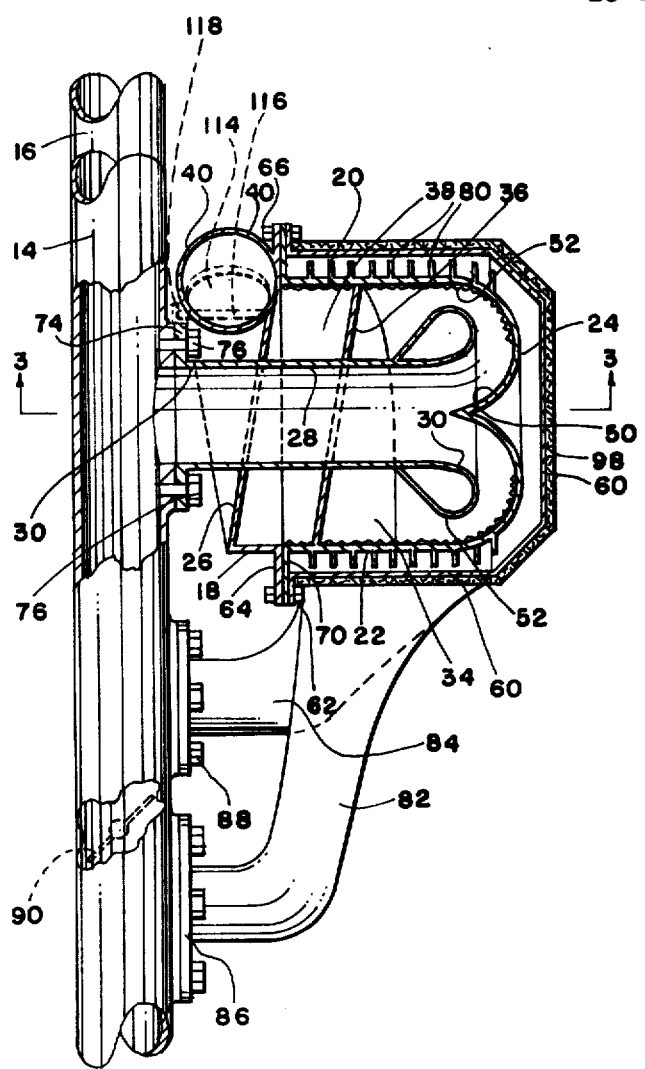
FIG. 2 is a vertical view of the apparatus of FIG. 1, with the enhancer itself being shown in central horizontal section upon the plane of the section line 2—2 in FIG. 1.
Figure 3:
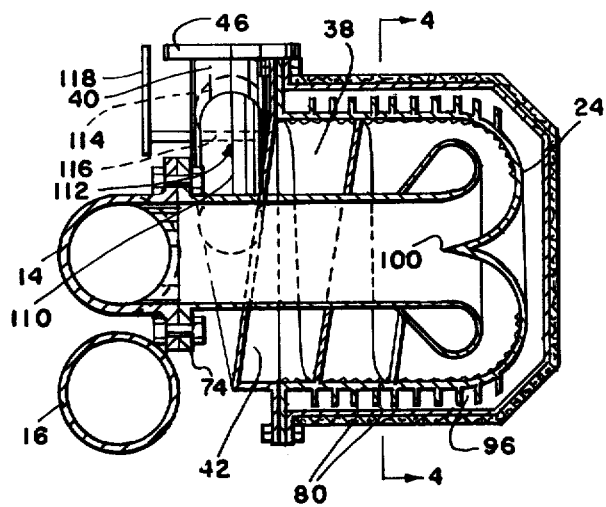
FIG. 3 is a vertical sectional view taken upon the plane of the section line 3—3 in FIG. 2.
Figure 4:
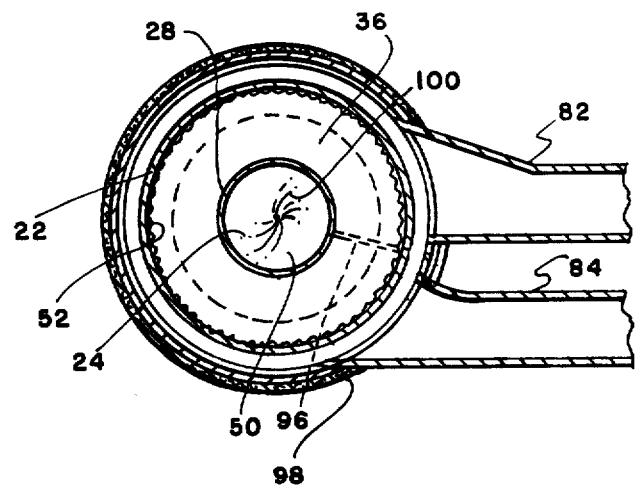
FIG. 4 is a transverse vertical sectional view taken upon the plane of the section line 4—4 in FIG. 3; and, FIG. 5 is an isometric view of the exhaust gas constrainer.
Figure 5:
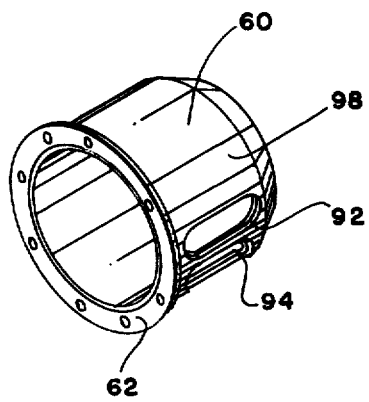

The enhancer 10 receives as its input the wet output mixture stream of the carburetor 12, and comprises a housing 18 comprised of hollow shell 20 having a generally cylindrical extent 22 that is closed at its outer end by an integral involute wall 24 as best shown in FIGS. 2 and 3.

The housing 18 is closed at its inner end by a wall 26, and the housing 18 is provided with a reentrant withdrawal tube 28 having its outlet end 30 opening through the latter and its inner or inlet end 32 spaced from the envolute wall 24.

The withdrawal tube 28 is coaxial with the shell 20 and is radially spaced from the latter to define an axially extending space 34 therebetween.

A spiral vane 36 is disposed within the annular space to define an axially extending spiral passageway means 38 with the vane 36 separating adjacent convolutions of the latter. The end wall 24 is contoured so as to be conformable to the spiral passageway means 38 and to constitute the inner end of the latter and to which is integrally connected the lower end of a vertical inlet pipe 40 by means of which a descending vertical fluid stream can be tangentially fed into the inlet end 42 of the spiral passageway means 38, whereby such stream has an angular momentum imparted thereto and whereby such stream is subjected to centrifugal forces as it travels a spiral path the axial extent of the space 34.

As shown, the upper end of the pipe 40 is provided with a coupling flange 46 by means of which it is detachably connected to the conventional output mounting flange, not shown, of the carburetor 12, whereby the wet fuel-air mixture is introduced into the enhancer.

The envolute wall 24 has an inner surface 50 that is a surface of revolution about the coincident axes of the shell 22 and the tube 28, and is such as to be concave from such axis to its juncture with the main body of the shell 22. The arrangement is such that a stream having traversed the spiral passageway 38 is then smoothly directed radially inwardly at the same time as the axial direction of movement is reversed so as to enter the inlet end 32 of the withdrawal tube 28. In the preferred construction, the inlet end 32 of the tube 28 is radially enlarged and the fluid path thereabout streamlined by way of the tube 28 being flared, inturned and swaged back upon itself as shown at 52.

The inner surface of the shell 22 is lined by a metal screen 54 for a purpose that would be evident on considering my prior applications, previously identified, and which will be presently explained.

The housing 20 has its outer end received in spaced relation within a generally cup-shaped exhaust gas container or confining configuration 60, and the latter and the wall 26 are provided with flanges 62 and 64 that are detachably retained in assembled relation by conventional threaded fastener means 66 that extend through the flanges 62 and 64 and an interposed integral flange 70 of the shell 22. As the tube 28 is securely fixed to the wall 26 in any suitable manner, such as by welding or the like, the withdrawal tube 28 is held in position by such assembly. The vane 36 is welded to the tube 28 and can be tack welded at spaced positions to the shell 22. Preferably, but not necessary, the vane 36 is slightly spaced throughout most if not all of its length from the shell 22 to minimize the pickup of heat therefrom.

The outlet end 30 of the tube 28 is provided with a coupling flange 74 by means of which the enhancer 10 is connected to the intake manifold 14 through the use of detachable fastening means 76 for communication between the outlet end of the eductor tube 28 and the interior of the intake manifold.

The exterior of the shell 22 is provided with a plurality of integral heat exchange fins or ribs 80 that project into the space between the shell 22 and the container 60, such being for the purpose of transferring heat from hot exhaust gases circulated in such space to the shell 22.

A pair of pipes 82 and 84 are detachably connected by coupling means 86 and 88 to the exhaust manifold 16 at spaced positions along the extent of the latter, and an externally operable butterfly valve means 90 is interposed in the exhaust manifold 16 intermediate the pipes 82 and 84. If desired, remote control means, not shown, can be provided to allow the automobile driver to control the valve means 90 from his driving position.

The container 60 has a pair of circumferentially spaced openings 92 and 94 and the pipes 82 and 84 are respectively welded to the container 60 to afford sealed communication with the interior of the same through such openings. A partition 96 is secured to the shell 22 and disposed in the space between the shell 22 and the container 60 so as to substantially limit fluid flow between the pipes 82 and 84 within the container other than that passing about the shell 22.

The exhaust heating system is such that greater closure of the valve means 90 causes an increased diversion of hot exhaust gas to enter the confining means 60, circulate about the shell 22 and its ribs and thence return to the exhaust manifold for the usual passage through the muffler and eventual discharge to the atmosphere. Needless to say, means for reducing the pollution effects of such exhaust gases can be applied upstream or downstream of the pipes 82 and 84 as appropriate.

To reduce burn hazards to mechanics and excess release of heat into the engine compartment, the container 60 can have an insulative layer of asbestos thereon such as shown at 98.

The operation of the enhancer 10 will be readily understood. The wet mixture from the carburetor has a substantial angular momentum imparted thereto as it enters the spiral passageway 38 and is subjected to substantial centrifugal forces as it is directed along the spiral path by such passageway means 38. Such centrifugal forces are so great and applied for sufficient time that the liquid droplets are caused to move toward and into contact with the heated shell 22. This effect is especially pronounced as to the larger the droplets. The impinging drops may skip and bounce (as does water on a hot stove) and fragment as they tend to be along with the fuel-air stream traveling the spiral path, and all the time are subjected to evaporative conditions. The screen 52 serves to preferentially retard the liquid droplets against movement along the spiral path at the rate that would otherwise occur. The desired retardation at the inner surface of the shell 22 is preferentially effective in relation to liquids because of the much higher viscosity of the latter and such is most desirable as it tends to assure what may be considered a dwell time adequate to evaporate all or substantially all of the liquid.

Upon the stream completing the defined spiral path, the same is radially inverted from the previous centrifugal gradation, by the stream being reversed in its axial direction of movement by the evolute wall, together with the radial inward movement that increases the angular velocity whereby centrifugally induced countercurrents of relatively dense and light portions of the stream are caused in the tube 28.

Any liquid reaching the end of the spiral path tends to be excluded from radial inward movement on very little angular velocity, so that any liquid entering the tube 28 must first move to the apex 100 of the end wall 24 and thence enter the tube 28 through the rapidly rotating vapors entering the same. The law of conservation of angular momentum favors the continued and even an increase in the angular velocity of the vapors. Liquid, especially heated liquid, entering the tube 28 from the wall 24 apex 100 in such a manner would be suscepted to dispersive forces tending to disperse and afford an intimacy of liquid vapor contact favoring evaporation of the liquid.

The valve means 90 enables a convenient means for limiting the heat supplied to the shell 22 to be substantially only sufficient to vaporize the liquid preferentially in contact therewith without substantially raising the sensible heat of the mixture.

The output of the enhancer 10 has its approach to thermal equilibrium optimized to produce a fuel-air mixture that is entirely or near liquid-free and in a near saturation condition for the temperature and pressure thereof. In other words, the air and fuel fed to the intake manifold is essentially a homogeneous mixture at substantially the lowest possible temperature (in relation to the pressure thereat prevailing and in relation to the fuel-air ratio) at which substantially all the fuel can be in the vapor phase. The result is a vastly improved engine combustion with the dual benefits of greater fuel economy and efficiency with a substantial reduction in the pollution characteristics of the exhaust.

If deemed necessary or expedient, means hereinafter described can optionally be provided to enable the fuel-air stream to bypass the enhancer 10 as may in some operator's opinion be desirable in certain instances such as when the operator is starting the engine or when the characteristics of normal engine operation may briefly be of more importance than the ecological and economy benefits of the present invention.

Such optional bypass means can conveniently take the form of a tube 110 connected between the pipe 40 and the tube 28 adjacent the outlet 30 of the latter, whereby essentially direct communication between the carburetor 12 and the intake manifold 14 can be effected.

Valve means 112 are provided for selectively closing communication of the upper part of the pipe 40 with either the tube 110 or the lower part of the pipe 40 (the inlet 42 of the spiral passageway). The valve means 112 comprises a valving element or flap 114 pivotally mounted at one edge thereof to the bottom of the juncture of the pipe 40 and the tube 110 as indicated at 116 so that it may be pivoted between a first limiting and vertical position such that it closes the tube 110 while opening the pipe 40 and a second limiting and horizontal position such that the tube 110 is open and the pipe 40 closed below the juncture of the tube 110 therewith. The first position is the normal position with the enhancer 10 being in full operation, while the second position renders the enhancer 10 inoperative though the same can become heated in anticipation of being placed in use.

The valve means 112 includes an external actuating lever 118 by means of which the same can be manually controlled, preferably by a remote control means, not shown, of conventional character such that the driver can control the same from his driver's position.

If desired or deemed expedient, the valve element 114 can be selectively positioned intermediate its limiting positions whereby controllable portions of the output of the carburetor 12 will pass through and bypass the enhancer 10.

The enhancer 10 by lengthening the path from the carburetor to the intake manifold increases the time for such passage to be effected and such extension of time in and of itself tends to favor the mixture tending to move toward thermodynamic equilibrium; however, it should be recognized that such extension of time in and of itself is of relatively negligible importance as a contributor to the results obtained in the use of the enhancer 10. The overwhelmingly significant contributor to the substantial homogenous (by which is meant a uniform mixture throughout on a microscale—indeed, on a near molecular dimension scale) is the fact that the fuel in a vapor state will move at a high diffusional velocity into all regions wherein its concentration (or partial pressure) is relatively lower, as will be clear on considering Dalton's Law concerning partial pressures. Fuel molecules energized to be in the vapor phase move at vastly greater velocities diffusional transport thereof will continue until equal concentration is realized.

The selective application of heat to liquid fuel, and preferentially retaining unvaporized fuel in a region to which heat is being introduced enables optimization of the application of Dalton's Law while minimizing the amount of heat required to do so.

The described apparatus can be conveniently made substantially in its entirety of conventional steel and by well known manufacturing procedures. The same can be added to extant equipment with little modification and at a very modest expense in relation to the economy realized, not to mention the public benefit as to the ecology.

Attention is directed to the appended claims.

I claim:

1. A method of treating the output stream of the carburetor of an internal combustion engine prior to introducing the same into the intake manifold of the engine so as to obtain a stream approaching equilibrium that is essentially liquid free and of substantially saturation composition, said method comprising the step of imparting angular momentum to the carburetor output stream and centrifuging vaporizable liquid droplets entrained therein against a surrounding shell solely by directing such stream into a spiral passageway defined in part by the surrounding shell and a partition wall disposed between and providing fluid separation between adjacent convolutions of the passageway, whereby the stream travels a spiral path having an axial component in one direction within the confines of the surrounding shell, the step of thereafter directing the stream exiting from the spiral passageway to the intake manifold along an exiting path that is radially within, separated from and having an axial component in a direction opposite to that of the spiral path, and the step of heating the exterior of the surrounding shell an amount approximately sufficient to vaporize all the liquid droplets centrifuged thereagainst, whereby angular momentum is initially imparted to the stream solely by reaction of the stream against the heated surrounding shell to the end that entrained liquid droplets impinge substantially solely upon a heated surface with impingement upon and coalescence of liquid droplets upon a relatively cool surface being thereby substantially avoided.

2. The method of claim 1, wherein the output stream of the carburetor comprises liquid droplets of vaporizable fuel entrained in a vapor phase constituted of a mixture of air and substantially less than a saturating component of vaporized fuel in relation to the pressure and temperature prevailing in the bulk of the vapor phase.

3. The method of claim 1, wherein the output stream of the carburetor comprises liquid droplets of vaporizable fuel entrained in a vapor phase constituted substantially solely of air.

4. The method of claim 1, wherein the velocity of the stream immediately adjacent the shell is impeded by physically obstructing and preventing smooth flow of the stream immediately adjacent the shell, whereby the dwell time of centrifuged liquid in immediate proximity of the heated shell is extended while the vapors thereof can be swept away with the stream.

5. The method of claim 1, wherein the entirety of the output stream of the carburetor is treated.

6. The method of claim 1, wherein a portion only of the output stream of the carburetor is treated, with the balance being directed untreated to the intake manifold, and the step of controlling the relative magnitude of the portion that is treated.

7. The method of claim 1, wherein liquid droplets centrifuged against the shell and which have not been vaporized are centrifugally restrained against entry into the exiting path by reason of substantially maintaining the value of the angular momentum imparted to the stream as the same is directed into the exiting path.

8. A carbonation enhancer for use intermediate the carburetor and the intake manifold of an internal combustion engine, said enhancer comprising an axially extending housing comprised of an outer shell closed at one end of the housing by an end wall, said housing having an axially extending reentrant withdrawal tube at its other end that has an internal inlet end spaced from the end wall, said tube having an external outlet end adjacent the other end of the housing, said shell and said tube being radially spaced to define an axially extending annular space therebetween, a spiral vane in said space defining an obstruction free spiral passageway extending from an inlet end of the housing to said one end thereof for directing a fluid stream entering the inlet end of the housing along a spiral path axially toward said one end of the housing, said vane being disposed between adjacent convolutions of the spiral passageway and preventing axial fluid flow between adjacent convolutions of the passageway, means for enabling coupling of the outlet end of the tube to an engine intake manifold, means for enabling coupling of the inlet end of the housing to a carburetor, and means for heating the shell whereby the output of a carburetor travels in one axial direction to said one end of the housing along the spiral path, thence travels radially inwardly and reverses its axial direction of travel to enter the inlet end of the withdrawal tube to travel the outlet end of the latter to constitute the input for an intake manifold.

9. The combination of claim 8, wherein said end wall is of envolute form.

10. The combination of claim 8, wherein said end wall has an internal surface that is a surface of revolution that is internally concave intermediate its axis and its juncture with the shell.

11. The combination of claim 10, wherein the tube is radially enlarged adjacent its inlet end.

12. The combination of claim 8, including a valve controlled fluid bypass connecting the inlet end of the housing to the outlet of the tube.

13. The combination of claim 8, including means lining the interior of the shell for substantially impeding the velocity of fluid flow through the spiral passageway immediately adjacent the shell.

* * * * *